United States Patent Office 3,431,143
Patented Mar. 4, 1969

3,431,143
PROCESS FOR SIZING PAPER WITH EPOXY SILICONE AND RESULTING PRODUCTS
Gordon C. Johnson, Tonawanda, and Samuel Sterman, Williamsville, N.Y., assignors to Union Carbide Corporation, a corporation of New York
No Drawing. Filed Apr. 22, 1965, Ser. No. 450,192
U.S. Cl. 117—155    12 Claims
Int. Cl. D21h 1/40, 3/62

ABSTRACT OF THE DISCLOSURE

As an article of manufacture, a paper having improved resistance to penetration by water, said paper containing as a sizing agent an epoxysilicone having the general formula:

$$MD_xU_yM'_q$$

wherein D represents an $R_2SiO$ unit in which R is a monovalent hydrocarbon radical free of acetylenic unsaturation; U represents a unit selected from the class consisting of

and $R'SiO_{3/2}$ in which R is a monovalent hydrocarbon radical free of acetylenic unsaturation and R' is a monovalent organic radical containing at least one vicinal epoxy

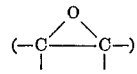

group; M and M' are in each occurrence an end-blocking unit having the formula:

in which R is a monovalent hydrocarbon radical free of olefinic unsaturation, R' is a monovalent organic radical containing a vicinal epoxy

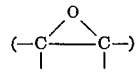

group, $a$ has a value from 0 to 1 inclusive; $q$ as a value of 1 when U is an

unit and a value of $(y+1)$ when U is an $R'SiO_{3/2}$ unit, $x$ is an integer having a value of from 10 to about $10^5$, $y$ is an integer having a value of from 1 to about $10^2$, the sum of $x$, $y$ and $q$ being such that the silicone compound $MD_xU_yM'_q$ has a molecular weight of from about $10^3$ to about $10^6$ and the ratio of epoxy-containing units to units containing no epoxy groups is within the range of from about 0.0001 to 0.5.

---

The present invention relates in general to novel sized paper compositions and to methods for preparing same, and more particularly epoxy modified silicone sized paper compositions and to methods for their preparation.

In addition to the cellulosic fibers which constitute the bulk of a finished paper, a wide variety of internally contained or surface carried ingredients are frequently employed to impart special properties. These ingredients include fillers such as clay, chalk, and other metallic oxides or salts; dyes and colorant materials, mordants, retention aids, wet-strength agents, sizes and the like. Paper is sized to increase its resistance to penetration by liquids, particularly water. The most widely used sizing materials are rosin soap (sodium rosinate) and papermakers alum (aluminum sulfate), but hydrocarbon and natural waxes, starches, sodium silicate, glues, and casein, synthetic resins, and rubber latex are among other materials used as sizing agents.

As with almost all other papermaking operations, conventional sizing still retains much of the empiricism and art of much earlier times. The techniques of sizing are many and varied and depend upon such variables as pH, temperature, other chemicals present, and fiber type and condition. The exact mechanism of sizing also varies with the particular sizing agent employed and in most instances is still the subject of considerable controversy. For example, using rosin and papermaker's alum, it is still a generally accepted but unproved theory that sizing is obtained by virtue of a colloidal system in which the negatively charged fibers hold a layer of positively charged aluminum hydroxide particles which in turn hold the negatively charged rosin. Such a theory is not necessarily valid with respect to other sizing agents such as glue or natural waxes.

In addition to the variety of mechanisms apparently involved with different sizing agents, it is not as a rule possible to predict the sizing effect any particular agent will have on one material from knowledge of the same sizing agent on another material.

Silicones, generally containing large mole percentages of methylhydrogen siloxane, have heretofore been reported as sizing agents for paper, but these materials suffer from three major shortcomings, namely (a) considerable time is required to develop water resistance under conventional paper treating conditons, (b) used in conjunction with catalysts to shorten cure time, the useful life of the silicone is shortened to impractical times, and (c) the presence of even small quantities of alum in the paper composition retards still further the time for development of water resistance.

It is therefore the general object of the present invention to provide a paper composition having a reliable and reproducible degree of resistance to liquid penetration and which can be prepared without the use of stringent empirical techniques.

It is a more particular object to provide a paper composition employing as the sizing agent an epoxy modified silicone which develops water resistance rapidly and has a high degree of tolerance for other chemical ingredients such as alum.

These and other and more particular objects which will be apparent from the specification appearing hereinafter are accomplished in accordance with the compositions of the present invention which comprise paper containing therein a sizing amount of a hydrophobic epoxy silicone having the general formula:

(I)    $MD_xU_yM'_q$ wherein D represents an $R_2SiO$ unit in which R is a monovalent hydrocarbon radical free of acetylenic unsaturation; U represents an

or $R'SiO_{3/2}$ $R'SiO_{3/2}$ unit in which R is a monovalent hydrocarbon radical free of acetylenic unsaturation and R' is a monovalent organic radical containing at least one vicinal epoxy

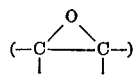

group; M and M' are in each occurrence the same or different end-blocking unit having the formula:

in which R is a monovalent hydrocarbon radical free of olefinic unsaturation, preferably an alkyl group containing from 1 to 6 carbon atoms or a hydrocarbyloxy radical in which the hydrocarbyl moiety is free of olefinic unsaturation and is preferably an alkoxy group containing from 1 to 10 carbon atoms or M and M' can be alkoxy radicals. R' is a monovalent organic radical containing a vicinal epoxy

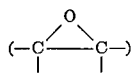

group, $a$ has a value from 0 to 1 inclusive; $q$ has a value of 1 when $U=RR'SiO$ and $y+1$ when $U=R'SiO_{3/2}$, $x$ is an integer having a value of from 10 to about $10^5$, $y$ is an integer having a value of from 1 to about $10^2$; the sum of $x$, $y$, and $q$ being such that the silicone compound $MD_xU_yM'_q$ has a molecular weight of from about $10^3$ to about $10^6$ and the ratio of epoxy-containing units to units containing no epoxy groups is within the range of from about 0.001 to 0.5, preferably from about 0.01 to about 0.25. It is to be understood that the overall average molecular weight of the silicone is not narrowly critical. Whereas silicones having molecular weights of several thousand, viz, 1000 to 50,000, perform advantageously, the only significant limitation on the maximum molecular weight values is the high viscosity of very high molecular weight polymeric silicones. Although very viscous epoxy silicones are still suitably employed, they are inconvenient to utilize and thus are not preferred.

Illustrative of the monovalent hydrocarbon radicals represented by R in the $R_2SiO_{1/2}$ and

units defined above for U are alkyl groups containing from 1 to 10 carbon atoms, preferably 1 to 6 carbon atoms such as methyl, ethyl, propyl, butyl, isobutyl, amyl, hexyl, octyl, and decyl; alkenyl groups such as vinyl, allyl, butadienyl, 1-pentenyl and the like; aryl radicals including fused ring structures such as phenyl, p-phenylphenyl, naphthyl, anthryl and the like; alkaryl radicals such as tolyl, xylyl, p-vinylphenyl, β-methylnaphthyl, and the like; aralkyl radicals such as stearyl, phenylmethyl and phenylcyclohexyl; and cycloalkyl radicals such as cyclopentyl, cyclohexyl and cyclobutyl. Preferred R radicals are alkyl with methyl being particularly preferred.

The monovalent organic radicals represented by R' which contain epoxy groups are, exclusive of the oxirane oxygen necessarily present, preferably hydrocarbon radicals free of acetylenic unsaturation or containing in addition to carbon and hydrogen only ether or carbonyl oxygen. Such R' radicals include 3,4-epoxycyclohexyl; 6-methyl-3,4-epoxycyclohexyl; 3-oxatricyclo[3.2.1.0$^{2,4}$]octane - 6 - propyl; 7 - butyl - 3 - oxatricyclo[3.2.1.0$^{2,4}$]octane-6-methyl; 3,4-epoxycyclohexyl-1-ethyl; 9,10-epoxystearyl; γ-glycidoxypropyl; p(2,3-epoxybutyl)phenyl; and 3-(2,3-epoxybutyl)cyclohexyl. The vicinal epoxy group can be but need not be a terminal group of the R' radical. Moreover, the R' radical can be simply a

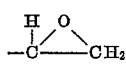

radical directly joined to silicon. A variety of epoxysilicone which are hereinbefore defined are illustrated structurally and further characterized with respect to physical properties in J.A.C.S., vol. 81, at pages 2632-2635, E. P. Plueddemann et al.

Because of ready availability of precursors and the excellent results obtained using the final product the preferred M and D units of Formula I above are $(CH_3)_3SiO_{1/2}$ and $(CH_3)_2SiO$ respectively. More particularly preferred are the silicones containing these M and D units in combination with at least one U unit of the formula:

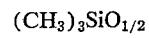

or

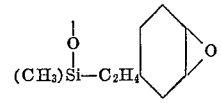

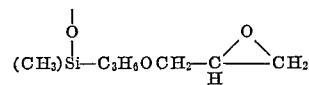

which polymers have the structure

wherein $y$ is an integer having a value of from about 8 to about 12 and $x$ is an integer having a value of from about 450 to about 550.

The aforesaid silicones are well known in the art and can conveniently be prepared, among other methods, by the platinum catalyzed addition of aliphatically unsaturated epoxy compounds to hydrosiloxanes, the ratio of reactants being such as to prevent the presence of unreacted, i.e., residual, hydrosiloxane moieties. It is to be understood however that trace hydrosiloxane contamination in the silicon can be tolerated without unduly affecting the compositions and processes of this invention, but preferably the silicone is hydrosiloxane-free. By trace amounts of hydrogen-siloxane is meant not more than that amount which will produce about 2 cc. hydrogen per gram of silicon by the NaOH gas evolution method.

The silicone sizing agents of this invention can be applied to the cellulosic fibers either before, during or after the paper forming operation, and can be applied either per se, in emulsion form or in solution in a suitable solvent. The addition of the sizing agent to the paper fibers prior to the time when they are interfelted into a relatively low water content self-supporting sheet is conventionally termed "wet end sizing" and is referred to as such hereinafter. Similarly, when the sizing agent is applied to the already formed paper, the process is conventionally, and hereinafter, referred to as "dry end sizing."

When a silicone sizing agent of this invention is applied to the wet end, it should be utilized in a water dispersible form such as an emulsion of the silicone in water. In this form, the sizing agent can be added to the water-dispersed pulp at any time up until the fibers are picked up on the wire or cylinder of the paper machine, but preferably after the beating operation which produces the fibers from the starting material.

The optimum procedure for applying the epoxysilicone sizing agent to the dry end will depend upon such factors as the type of papermaking equipment available, weight and speed of the paper, the particular sizing being employed, and whether it is desired to obtain complete saturation of the paper or only a surface coating. Any convention technique of application can be used such as by means of a water box on a calender, tub sizing (dipping), size press, transfer roll, spraying, and the like.

The quantity of epoxysilicone sizing contained in the final paper product is not narrowly critical and optimum values vary slightly with the type of paper being sized. In general however, from about 0.005 to about 1.0 weight percent epoxysilicone based on the weight of the dry paper product provide adequate sizing. It is preferred to use from about 0.02 to about 0.2 weight percent epoxysilicone. Where wetting and adhesion of inks or glues is desired, the quantity of epoxysilicone should, in general not exceed about 0.8 weight percent.

As is generally known in the art, in the application of sizing agents to the water dispersed pulp it is advantageous to employ retention aids in conjunction with the sizing agent in order to facilitate adherence of the sizing agent to the pulp fibers. As a rule, without retention aids a substantial portion of the sizing agent remains held by the water phase of the pulp and as a consequence quantities of sizing agent in excess of that which are desired in the final paper product must be employed. On the other hand, where dry end sizing is employed and, for example, application is made to only one side of the paper continuum, adequate sizing of one surface of the paper can be obtained using less than the usual quantity of epoxysilicone hereinbefore indicated.

Retention aids are well known in the art and include gums, starches, and resins such as polyethyleneimine, sulfonium methyl sulfate salt of an acrylic acid-acrylamide copolymer, cationic starches, cationic silicones, polyamineepichlorohydirn adducts, and carboxymethylcellulose.

The epoxysilicones of this invention are capable of imparting water resistance to paper by curing without benefit of catalysts or elevated temperatures. The length of time required for uncatalyzed curing depends primarily on the particular epoxysilicone and type of paper fiber substarate employed. For example, on reclaim pulp and under mill conditions, cure has occurred in 4 to 8 hours. From about 3 to about 7 days are required for most epoxy silicones to cure in unbleached kraft paper at ambient room temperature. Somewhat longer times at the same temperature are required for the same epoxysilicones on filled bleached pulp systems. In these compositions the use of curing catalysts is advantageous. Such catalysts include the metal salts of strong acids as for example aluminum sulfate and zinc nitrate, and polymeric anhydrides such as poly(methyl vinyl ether/maleic anhydride), poly(styrene/maleic anhydride) and tetrapropenylsuccinic anhydride. Particularly good results are obtained using poly(styrene/maleic anhydride) containing at least about 10 mole percent interpolymerized maleic anhydride, preferably from about 25 to about 50 mole percent.

The quantity of catalyst relative to the curable epoxy silicone is not critical and can be suitably employed in a weight ratio (catalyst to silicone) of from about 20:1 to about 1:20.

As stated hereinbefore, instead of adding the epoxysilicones per se to the pulp or preformed paper it is frequently advantageous to utilize the sizing agent in solution in an inert solvent or dispersed in an emulsion. Emulsions have been formed to be appropriate both in wet end and in dry end applications. Solvent systems are more commonly used for dry end than for wet end sizing. The choice of solvents and emulsifiers is governed primarily by the method of application selected and considerations respecting ease of handling.

Inert organic solvents include both aliphatic and aromatic hydrocarbon compounds and halogenated analogs thereof such as kerosene, benzene, and perchloroethylene. Emulsifiers can be either non-ionic, cationic, or anionic with the amount an exact emulsifier composition being determined by the practical consideration of application procedure, emulsion stability and minimum interference with the epoxysilicone hydrophobing properties. Non-ionic emulsifiers include trimethylnonylpolyethylene glycol ether/nonylphenylpolyethylene glycol ether blends, poly(vinyl alcohol), and polyoxyethylene ester of mixed fatty and resin acids; cationic emulsifiers include N-cetylethyl morpholinium ethosulfate, and cationic starch, either alone or in combination with poly(vinyl alcohol) or sodium lignin sulfonate. A suitable anionic emulsifier has been found to be lauryl alcohol sulfate in combination with poly(vinyl alcohol).

Numerous other organic and inorganic materials used in papermaking can be employed with the epoxysilicones in this invention. Fillers such as clay, chalk, metallic oxides, dye, colorants, mordants, wet-strength agents and the like are found to perform their usual function without unduly affecting the sizing properties of the epoxysilicones.

The fiber content of the paper sized in accordance with this invention can be primarily of reclaimed ground wood, unbleached soft wood kraft, bleached soft wood, and mixed hardwood and soft wood prepared by the sulfate or soda process. High grade pulps containing a high rag content are also suitable but in many instances require somewhat greater amounts of epoxysilicone sizing agent than lower grade wood pulps to attain a comparable degree of water resistance.

Typical drying-cure conditions for paper manufacture can be used with the epoxysilicone compositions of the present invention. For example, for paper weighing about 40 pounds per 3000 sq. ft., curing for 2–5 minutes at temperatures of 190–220° F. is entirely satisfactory.

The following examples will further exemplify the invention, but are in no way intended to be limitative thereof.

EXAMPLE 1

An epoxysilicone sizing agent was prepared by mixing together 8.75 grams of a 2 centistoke trimethyl endblocked dimethylpolysiloxane, 18.0 grams of a trimethyl endblocked methylhydrogenpolysiloxane 974.8 grams dimethylpolysiloxane cyclics (depolymerizate) and 20 grams concentrated sulfuric acid. After agitating this mixture for 2½ hours, the viscosity increased to form a viscous fluid. To this was added 200 cc. of toluene and 50 grams of sodium bicarbonate. The composition was stirred for 1 hour and then heated to 180° C. and sparged with nitrogen at 2 liter/minutes for 2 hours. When cool the material was filtered. The resulting oil had a viscosity of 3000 centipoises, a hydroxyl content less than 0.1 weight-percent, and a silanic hydrogen content of 6.3 cc. $H_2$/gram using the caustic hydrogen evolution test. 400 grams of this fluid were mixed with 100 grams isopropylether, 14.4 grams vinyl-3,4-epoxycyclohexene, and 10 parts per million platinum in the form of chloroplatinic acid. The resulting mixture was heated to 85° C. and the rapid refluxing indicated an exothermic reaction had occurred. After heating 2 hours at 85° C. 1 gram benzolthiozole was added, and mixed for 10 minutes. The polymer was cooled and filtered using a filter aid. The polymer was returned to a kettle and sparged with 2 liters $N_2$/minute at 135° C. When solvent no longer was being removed, the material was vacuum sparged at <40 mm. pressure for 1 hour. The product had the following analysis; epoxy content, 1.0±0.3%; silanic hydrogen, 1.2 cc. $H_2$/g.

EXAMPLE 2

Using the same procedure as in Example 1 and the same reaction formulations except that an equivalent amount of allyl glycidyl ether was substituted for the vinyl-3,4-epoxycyclohexene therein, a polymeric sizing agent was produced having the following analysis; viscosity at 25° C.–7500 centipoises; hydroxyl content, <0.1%; epoxy content, 0.9±0.2%; silanic hydrogen, 0.8 cc. $H_2$/gram.

EXAMPLE 3

The effectiveness of the epoxysilicone sizing agents prepared in Examples 1 and 2 were determined by the following procedure: Emulsions of the two epoxysilicones respectively were prepared by mixing 50 grams of each with 35.5 grams of a 10% polyvinylalcohol solution, adding 114.5 grams additional water and mixing until uniform. This emulsion was homogenized using a hand homogenizer.

Each of these emulsions was diluted to 0.55% silicone concentration and applied to unbleached kraft paper using a 2 roll, laboratory calender equipped with a water box on the bottom roll. The application was at 400 feet/minute. The paper was a 2.5 gram handsheet (46 pounds/3000 ft.²) prepared from unbleached kraft pulp which had been beaten to a Canadian Freeness of 450-550 ml. Each silicone respectively was deposited at approximately 0.1 weight-percent silicone. The treated paper was conditioned at 75° F. and 50% relative humidity. The water absorption was measured after various aging periods using the TAPPI test (T-441 Cobb). The water temperature was 75° F. and the contact time 1 minute.

approximately 3 minutes at 190° F. using a drum drier. The paper weighed 2.5 grams/handsheet or approximately 46 pounds/3000 sq. ft. The paper was conditioned for 7 days at 75° F. and 50% relative humidity and then tested for water resistance using a size tester device which measures the time for water to penetrate through the paper. The longer the time, the greater the resistance (see TAPPI, October 1951, pp. 137A–148A for complete tester details). The emulsion compositions and results are set forth in Table II below:

TABLE II

| Example | Emulsifier | Percent Emulsifier based on silicone | Retention Aid | Percent Retention Aid based on pulp | Water Penetration time, seconds |
|---|---|---|---|---|---|
| 5 | Poly(vinylalcohol) <br> Sodium lauryl sufate | 10 <br> 1 | Alum | 1 | 36 |
| 6 | Trimethylnonylpolyethylene glycol ether <br> Nonylphenylpolyethylene glycol ether | 6 <br> 4 | Alum <br> Cationic starch | 1 <br> 0.5 | 55 |
| 7 | Trimethylnonylpolyethylene glycol ether <br> Nonylphenylpolyethylene glycol ether | 6 <br> 4 | Sulfonium methylsulfate salt of acrylic acid-acrylamide copolymer. <br> Alum | 0.1 <br> 1 | 60 |
| 8 | Polyoxyethylene ester of mixed fatty and resin acids | 10 | Cationic starch <br> Alum | 0.5 <br> 1 | 53 |
| 9 | Cationic starch <br> Sodium lignin sulfonate | 50 <br> 5 |  |  | 57 |
| 10 | Control, no expoxysilicon sizing agent |  |  |  | 1 |

TABLE I

| Sizing Agent | Water Absorption (Grams/100 cm.²) | | |
|---|---|---|---|
| | 2 days | 3 days | 6 days |
| None | 1 | 1 | 1 |
| Vinylepoxycyclohexene silicone | 0.2 | 0.2 | 0.2 |
| Allyl glycidyl ether mod. silicone | | 0.6 | 0.2 |

EXAMPLE 4

The vinylcyclohexene epoxide modified silicone of Example 1 was diluted with toluene to 0.078%. Handsheets made from bleached sulfite paper and weighing 46 pounds/3000 sq. ft. were treated with this solution to give a loading of 0.1% silicone. Paper made with 4½% papermakers alum added to the pulp was also treated with this solution and similar concentration of 10,000 centistokes trimethyl endblocked dimethylpolysiloxane. The water resistance was measured using the Cobb water absorption test after the paper had been conditioned 7 days at 75° F. and 50% relative humidity. The results are shown in tabular form below.

| Sizing agent | Alum in Paper | Water Absorption (g./100/cm.²) |
|---|---|---|
| Epoxy silicone | No | 0.2 |
| Do | Yes | 0.2 |
| Dimethylsilicone | Yes | 0.9 |

EXAMPLES 5–10

Emulsions of the vinylcyclohexene epoxide modified silicone sizing agent of Example 1 were made using various combinations of emulsifiers with water. These emulsions were diluted and added to pulp which had been beaten to approximately 400 ml. Canadian Freeness and diluted to 0.1% consistency with tap water. The pulp was a mixture of 50% bleached kraft, 25% bleached sulfite and 25% bleached hardwood sulfite to which had been added 20% pulverized papermakers clay. The silicone emulsion was added to give 0.5% silicone concentration based on the weight of pulp. Following the silicone, retention aids were in some instances added and the system agitated for approximately 10 minutes. The pulp was further diluted 5/1 with water and made into paper using a Noble and Wood sheet mold. The paper was dried for

EXAMPLE 11

The vinylcyclohexene epoxide silicone sizing agent of Example 1 was emulsified with water and the emulsifier combination of Example 6 using a total of 10 weight percent emulsifier based on silicone. The emulsion was diluted to approximately 1% silicone and added to a pulp mixture of reclaimed kraft and newsprint which was taken from a paper mill at the Jordan discharge. This pulp was diluted from 4.1% consistency to 0.5% consistency using paper mill white water. The silicone emulsion was added to give a concentration of 0.1% based on the weight of dry pulp. Also added was 0.5% papermakers alum based on the weight of paper and sufficient sulfuric acid to adjust to pH 4.5. The system was mixed 2 minutes and handsheets were made which when dry weighed 10 grams. After conditioning the paper for two days at 75° F. and 50% R.H., the water resistance was measured using the Cobb test. The Cobb water was 120° F. and the contact time 3 minutes. The water absorption of the silicone sized paper was 0.65 g./100 cm.² while similar paper made without silicone sizing absorbed 3.3 g./100 cm.².

EXAMPLE 12

The vinylcyclohexene epoxide modified dimethyl silicone of Example 1 was emulsified with a blend of trimethylnonylpolyethylene glycol ether and nonylphenylpolyethylene glycol ether using 5 wt. percent emulsifier based on silicone. A catalyst solution consisting of 12 grams poly(styrene/maleic anhydride) in 585 grams H₂O and 2.64 grams NaOH was prepared and admixed with the silicone emulsion. A paper formed from pulp consisting of 25 wt. percent bleached soda hardwood, 25 wt. percent bleached sulfate softwood and 50 wt. percent bleached sulfate softwood in combination with 20 wt. percent papermaker's clay based on the total of the wood fiber content, was immersed in the silicone and catalyst mixture to give a loading of 0.1 weight percent silicone based on the weight of the paper. The paper was dried for 3 minutes at 190° F. and conditioned for four days at 75° F. and 50% relative humidity. The paper was thereafter found to exhibit excellent resistance to penetration by water.

EXAMPLE 13

The emulsified epoxysilicone sizing composition and the poly(styrene/maleic anhydride) catalyst composition prepared in Example 12 were combined in varying ratios and applied to sheets of 15 pound/ream commercial paper made from 20% bleached semichemical hardwood and 80% bleached semichemical softwood. The various mixtures were applied to both sides of the paper sheets which were thereafter dried for 3 minutes at 190° F.

After conditioning the paper for 24 hours at 75° F. and 50% relative humidity, the water resistance was measured using the conventional Cobb test. The Cobb water temperature was 75° F. and the contact time one minute. The following data and results demonstrate the water resistance imparted by low silicone sizing loadings and various catalyst-silicone ratios.

| Paper Loading, Wt. Percent Silicone | Paper Loading, Wt. Percent Catalyst | Silicone/Catalyst Wt. Ratio | Water Absorption g./72 cm.², 1 minute) |
|---|---|---|---|
| 0.01 | 0.005 | 2/1 | 0.18 |
| 0.022 | 0.011 | 2/1 | 0.11 |
| 0.00675 | 0.027 | 1/4 | 0.11 |
| 0.0155 | 0.0625 | 1/4 | 0.11 |
| 0.0043 | 0.043 | 1/10 | 0.11 |
| 0.01 | 0.1 | 1/10 | 0.12 |
| Blank (Control) | | | 0.5 |

EXAMPLE 14

A series of vinylcyclohexene epoxide modified polymers were prepared as in Example 1 and having the general formula shown in the Table A. These oils were emulsified using 3% trimethyl nonylpolyethylene glycol ether and 2% nonylphenyl polyethylene glycol ether based on the silicone. These emulsions were diluted to 0.2% silicone and 50% poly(methylvinylether-maleic anhydride) copolymer was added based on the silicone. A clay filled paper made from mixed bleached pulp of 44 pounds/3000 square feet was treated with these silicone baths using a laboratory calender equipped with a water box to give a loading of 0.1% silicone. The paper was dried three minutes at 190° F. The water resistance (Cobb) of the paper was measured. The higher viscosity polymers developed size at a faster rate but all systems developed comparable size (Table A).

TABLE A

| Silicone Formula | Epoxy/Non-Epoxy | Fluid Analysis | | Silanic Hydrogen, cc. H₂/g. | Water Resistance (g./72 cm.², 1 minute) | | | | |
|---|---|---|---|---|---|---|---|---|---|
| | | Vis. (cps.) | Wt. Percent C₂O | | Hours Aging Time at 75° F. | | | | |
| | | | | | 0 | 2 | 4 | 6 | 22 |
| MD₈₅U₄M | 0.11 | 120 | 3.7 | 0.5 | 0.44 | 0.42 | 0.36 | 0.30 | 0.17 |
| MD₄₉₀U₁₀M | 0.02 | 6,000 | 1.0 | 2 | 0.40 | 0.22 | 0.16 | | |
| MD₄₅₅U₂₅M | 0.075 | 11,000 | 2.9 | 1.6 | 0.16 | 0.15 | | | |

M=(CH₃)₃SiO₁/₂.
D=(CH₃)₂SiO.

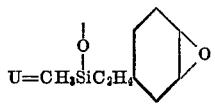

U=CH₃SiC₂H₄

EXAMPLE 15

A second series of tests were conducted similar to the first but using the sodium salt of a poly(styrene-maleic anhydride) as the catalyst. Again the higher viscosity polymer cured faster than the low molecular weight material, and the non-epoxy modified polymer exhibited no measurable water repellency (Table B).

TABLE B

| Silicone Formula | Percent Silicone Deposited | Silicones/Catalyst | Water Resistance (g./72 cm.², 1 minute) | |
|---|---|---|---|---|
| | | | Hours Aging Time at 75° F. | |
| | | | 0 | 24 |
| MD₈₅U₄M | 0.1 | 2/1 | 0.32 | 0.20 |
| | 0.025 | 1/4 | 0.30 | 0.27 |
| MD₄₉₀U₁₀M | 0.1 | 2/1 | 0.20 | 0.17 |
| | 0.025 | 1/4 | 0.21 | 0.19 |
| MD₅₀₀M | 0.1 | 2/1 | 0.6 | 0.6 |
| | 0.025 | 1/4 | 0.6 | 0.6 |

M=(CH₃)₃SiO₁/₂.
D=(CH₃)₂SiO.

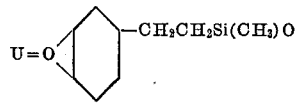

What is claimed is:

1. A paper having improved resistance to penetration by water, which paper is sized with an epoxy silicone having the general formula:

$$MD_xU_yM'_q$$

wherein D represents an $R_2SiO$ unit in which R is a monovalent hydrocarbon radical free of acetylenic unsaturation; U represents a unit selected from the class consisting of

and $R'SiO_{3/2}$ in which R is a monovalent hydrocarbon radical free of acetylenic unsaturation and R' is a monovalent organic radical containing at least one vicinal epoxy

group; M and M' are in each occurrence an end-blocking unit having the formula:

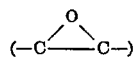

in which R is a monovalent hydrocarbon radical free of olefinic unsaturation, R' is a monovalent organic radical containing a vicinal epoxy

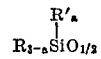

group, $a$ has a value from 0 to 1 inclusive; $q$ has a value of 1 when U is an

unit and a value of $(y+1)$ when U is an $R'SiO_{3/2}$ unit, $x$ is an integer having a value of from 10 to about $10^5$, $y$ is an integer having a value of from 1 to about $10^2$, the sum of $x$, $y$ and $q$ being such that the silicone compound $MD_xU_yM'_q$ has a molecular weight of from about $10^3$ to about $10^6$ and the ratio of epoxy-containing units to units containing no epoxy groups is within the range of from about 0.001 to 0.5.

2. The sized paper as in claim 1 wherein the epoxy-silicone sizing agent is present in an amount of from about 0.005 to about 1.0 weight percent based on the weight of the dry sized paper product.

3. The sized paper as in claim 1 wherein the epoxy-silicone sizing agent is present in an amount of from about 0.02 to about 0.2 weight percent based on the weight of the dry sized paper product.

4. The sized paper as in claim 3 wherein the epoxy-silicone sizing agent has an average molecular weight of from about 1000 to about 50,000 and the ratio of epoxy-containing units thereof to units containing no epoxy groups is within the range of from about 0.01 to about 0.25.

5. The sized paper as in claim 4 wherein in the epoxy-silicone having the general formula $MD_xU_yM'_q$ M and M' are in each occurrence an endblocking unit having the formula $$R_{3-a}\underset{\underset{R'_a}{|}}{Si}O_{1/2}$$

in which R is an alkyl group containing from 1 to 6 carbon atoms inclusive.

6. The sized paper as in claim 5 wherein in the epoxy-silicone having the general formula $MD_xU_yM'_q$ D represents units having the formula $(CH_3)_2SiO$.

7. The sized paper as in claim 3 wherein in the epoxy-silicone sizing agent having the formula $MD_xU_yM'_q$ D represents a $(CH_3)_2SiO$ unit; U represents a

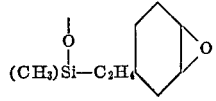

unit and wherein y has a value of from about 8 to about 12 and x has a value of from about 450 to about 550.

8. The sized paper as in claim 3 wherein in the epoxy-silicone sizing agent having the formula $MD_xU_yM'_q$ D represents a $(CH_3)_2SiO$ unit; U represents a

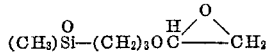

unit and wherein y has a value of from about 8 to about 12 and x has a value of from about 450 to about 550.

9. Process for preparing sized paper which comprises forming a slurry of paper fibers in a water medium, adding to the slurry thus formed a water dispersible emulsion of an epoxy-silicone, interfelting and separating said paper fibers from the water dispersion medium to form a paper web, and thereafter drying said paper, said epoxy-silicone being employed in an amount of from about 0.05 to about 1.0 weight percent based on the weight of the dry sized paper product and having the general formula $MD_xU_yM'_q$ wherein D represents an $R_2SiO$ unit in which R is a monovalent hydrocarbon radical free of acetylenic unsaturation; U represents a unit selected from the class consisting of $$R-\underset{\underset{R'}{|}}{Si}-O$$

and $R'SiO_{3/2}$ in which R is a monovalent hydrocarbon radical free of acetylenic unsaturation and R' is a monovalent organic radical containing at least one vicinal epoxy

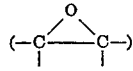

group; M and M' are in each occurrence an end-blocking unit having the formula:

$$R_{3-a}\underset{\underset{R'_a}{|}}{Si}O_{1/2}$$

in which R is a monovalent hydrocarbon radical free of olefinic unsaturation, R' is a monovalent organic radical containing a vicinal epoxy

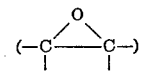

group, a has a value from 0 to 1 inclusive; q has a value of 1 when U is an $$R-\underset{\underset{R'}{|}}{Si}O$$

unit and a value of (y+1) when U is an $R'SiO_{3/2}$ unit, x is an integer having a value of from 10 to about $10^5$, y is an integer having a value of from 1 to about $10^2$, the sum of x, y and q being such that the silicone compound $MD_xU_yM'_q$ has a molecular weight of from about $10^3$ to about $10^6$ and the ratio of epoxy-containing units to units containing no epoxy groups is within the range of from about 0.001 to 0.5.

10. Process according to claim 9 wherein there is added to the water slurry of paper fibers and epoxy-silicone emulsion a catalytic amount of a curing catalyst for said epoxy-silicone.

11. Process according to claim 10 wherein the curing catalyst is poly(methylvinylether-maleic anhydride) and is employed in an amount such that the weight ratio of catalyst to epoxy-silicone is from about 1:20 to about 20:1.

12. Process according to claim 10 wherein the curing catalyst is poly(styrene-maleic anhydride) and is employed in an amount such that the weight ratio of catalyst to epoxy-silicone is from about 1:20 to about 20:1.

References Cited

UNITED STATES PATENTS

| | | | |
|---|---|---|---|
| 3,046,160 | 7/1962 | Dengler | 162—164 X |
| 3,120,546 | 2/1964 | Plueddemann | 117—155 X |
| 3,300,418 | 1/1967 | Andres et al. | 260—348 X |

FOREIGN PATENTS

| | | |
|---|---|---|
| 689,604 | 4/1953 | Great Britain. |
| 580,908 | 8/1959 | Canada. |

WILLIAM D. MARTIN, *Primary Examiner*

M. LUSIGNAN, *Assistant Examiner.*

U.S. Cl. X.R.

117—161; 162—164; 260—46.5, 348